United States Patent
Vitebsky et al.

(10) Patent No.: US 7,933,286 B2
(45) Date of Patent: Apr. 26, 2011

(54) DISTRIBUTED TRUNKING MECHANISM FOR VHF NETWORKING

(75) Inventors: Stanley Vitebsky, Parsippany, NJ (US); Jeffrey A. Kroon, Canandaigua, NY (US)

(73) Assignee: Harris Corporation, Melbourne, FL (US)

(*) Notice: Subject to any disclaimer, the term of this patent is extended or adjusted under 35 U.S.C. 154(b) by 1506 days.

(21) Appl. No.: 11/110,684

(22) Filed: Apr. 21, 2005

(65) Prior Publication Data

US 2005/0238040 A1 Oct. 27, 2005

Related U.S. Application Data

(62) Division of application No. 09/398,019, filed on Sep. 17, 1999, now Pat. No. 6,996,088.

(60) Provisional application No. 60/101,041, filed on Sep. 18, 1998.

(51) Int. Cl.
*H04L 12/28* (2006.01)

(52) U.S. Cl. ............ 370/431; 370/395.21; 370/400; 370/401; 370/444

(58) Field of Classification Search ........... 370/431, 370/432, 433, 442, 230, 231, 235, 280, 282, 370/294, 295, 337, 347, 310, 252, 400, 401, 370/402, 395.2, 395.21, 395.3, 395.31, 395.42, 370/444, 351, 352, 336, 338, 439, 445, 412, 370/416, 465; 709/216, 219, 226, 227, 229, 709/232, 233, 234, 241; 455/450, 453, 466, 455/403, 456.2, 464, 512; 710/240, 316, 710/241
See application file for complete search history.

(56) References Cited

U.S. PATENT DOCUMENTS

| | | | | |
|---|---|---|---|---|
| 3,675,217 A | * | 7/1972 | Dauber et al. | 711/130 |
| 3,919,692 A | * | 11/1975 | Kronies et al. | 710/244 |
| 3,967,247 A | * | 6/1976 | Andersen et al. | 711/136 |
| 4,121,158 A | * | 10/1978 | Hanni | 455/524 |
| 4,894,856 A | | 1/1990 | Nakanishi et al. | |
| 4,921,464 A | * | 5/1990 | Ito et al. | 455/512 |
| 5,168,570 A | * | 12/1992 | Eckert et al. | 710/241 |
| 5,226,071 A | * | 7/1993 | Bolliger et al. | 455/435.3 |
| 5,381,415 A | * | 1/1995 | Mizutani | 370/447 |
| 5,442,807 A | * | 8/1995 | Takayama | 455/453 |
| 5,463,629 A | * | 10/1995 | Ko | 370/463 |
| 5,506,847 A | | 4/1996 | Shobatake | |
| 5,572,679 A | * | 11/1996 | Ishizaka et al. | 709/227 |
| 5,724,346 A | * | 3/1998 | Kobayashi et al. | 370/329 |
| 5,790,551 A | | 8/1998 | Chan | |
| 5,872,931 A | * | 2/1999 | Chivaluri | 709/223 |
| 5,933,849 A | * | 8/1999 | Srbljic et al. | 711/118 |
| 5,953,312 A | * | 9/1999 | Crawley et al. | 370/218 |
| 5,966,372 A | * | 10/1999 | Wright et al. | 370/329 |
| 6,009,331 A | | 12/1999 | Ueda | |
| 6,021,122 A | * | 2/2000 | Tiedemann, Jr. | 370/331 |
| 6,038,601 A | * | 3/2000 | Lambert et al. | 709/226 |
| 6,069,882 A | * | 5/2000 | Zellner et al. | 370/329 |

(Continued)

*Primary Examiner* — Aung S Moe
*Assistant Examiner* — Abdullah Riyami
(74) *Attorney, Agent, or Firm* — Duane Morris, LLP (57) ABSTRACT

A system and method for communicating between nodes in a communications network. The network includes nodes that broadcast and receive data packets over a radio channel. The system includes a distributed trunking method that distributes the communications between the nodes over multiple channels. Voice and other data may be broadcast over data channels, while information regarding the availability of the data channels is broadcast over a control channel. Access to the control channel is controlled using a protocol that may include carrier sense multiple access with collision avoidance (CSMA/CA), time division multiple access (TDMA) or a hybrid of CSMA/TDMA.

3 Claims, 4 Drawing Sheets

U.S. PATENT DOCUMENTS

| | | | |
|---|---|---|---|
| 6,078,959 A * | 6/2000 | Wright et al. | 709/227 |
| 6,097,722 A * | 8/2000 | Graham et al. | 370/395.21 |
| 6,160,812 A * | 12/2000 | Bauman et al. | 370/416 |
| 6,185,221 B1 * | 2/2001 | Aybay | 370/412 |
| 6,195,331 B1 * | 2/2001 | Tani | 370/230 |
| 6,240,458 B1 * | 5/2001 | Gilbertson | 709/232 |
| 6,356,622 B1 * | 3/2002 | Hassell et al. | 379/1.01 |
| 6,370,119 B1 * | 4/2002 | Basso et al. | 370/252 |
| 6,370,148 B1 * | 4/2002 | Calvignac et al. | 370/412 |
| 6,404,756 B1 * | 6/2002 | Whitehill et al. | 370/338 |
| 6,438,110 B1 * | 8/2002 | Rai et al. | 370/254 |
| 6,442,138 B1 * | 8/2002 | Yin et al. | 370/232 |
| 6,606,303 B1 * | 8/2003 | Hassel et al. | 370/238 |
| 6,683,876 B1 * | 1/2004 | Tornes et al. | 370/395.1 |
| 6,721,324 B1 * | 4/2004 | Shinohara | 370/395.1 |
| 6,772,256 B1 * | 8/2004 | Regev et al. | 710/240 |
| 6,931,253 B1 * | 8/2005 | Hartikainen et al. | 455/450 |
| 7,050,445 B1 * | 5/2006 | Zellner et al. | 370/412 |
| 7,197,025 B2 * | 3/2007 | Chuah | 370/338 |
| 2002/0010735 A1 * | 1/2002 | McMillen et al. | 709/201 |
| 2002/0019234 A1 * | 2/2002 | Wright et al. | 455/450 |
| 2002/0062384 A1 * | 5/2002 | Tso | 709/229 |
| 2002/0131363 A1 * | 9/2002 | Beshai et al. | 370/230 |
| 2003/0198238 A1 * | 10/2003 | Westby | 370/402 |
| 2003/0214928 A1 * | 11/2003 | Chuah | 370/336 |
| 2004/0071113 A1 * | 4/2004 | Tiedemann, Jr. | 370/331 |
| 2005/0243858 A1 * | 11/2005 | Vitebsky et al. | 370/447 |
| 2006/0140152 A1 * | 6/2006 | Wang et al. | 370/331 |

* cited by examiner

DISTRIBUTED TRUNKING MECHANISM FOR VHF NETWORKING

CROSS REFERENCE TO RELATED APPLICATIONS

This is a [x] division of application Ser. No. 09/398,019, filed Sep. 17, 1999 now U.S. Pat. No. 6,996,088, which claims priority from U.S. Provisional Application Ser. No. 60/101,041 filed Sep. 18, 1998.

BACKGROUND OF THE INVENTION

The present invention is related to wireless data communication networks and, in particular, relates to controlling access to network resources.

Conventional wireless networks utilize various network access protocols in order to allow communicating nodes (i.e. radios) to share network resources. Wireless VHF communication networks typically include multiple nodes communicating over a single radio channel.

Conventional protocols generally permit each node to transmit over the radio channel without restriction. In one such protocol, the destination node sends an acknowledgment message upon successfully receiving the transmitted message. The source node waits for the acknowledgment message, and if the acknowledgment message is not received after a predetermined time period, the source node assumes that the transmitted message was not received and retransmits the message. Because nodes may transmit without restriction on the same channel, conflicts or collisions may occur that prevent the transmitted message from being received. A collision occurs whenever two or more nodes attempt to transmit simultaneously.

Figures 1, 3:
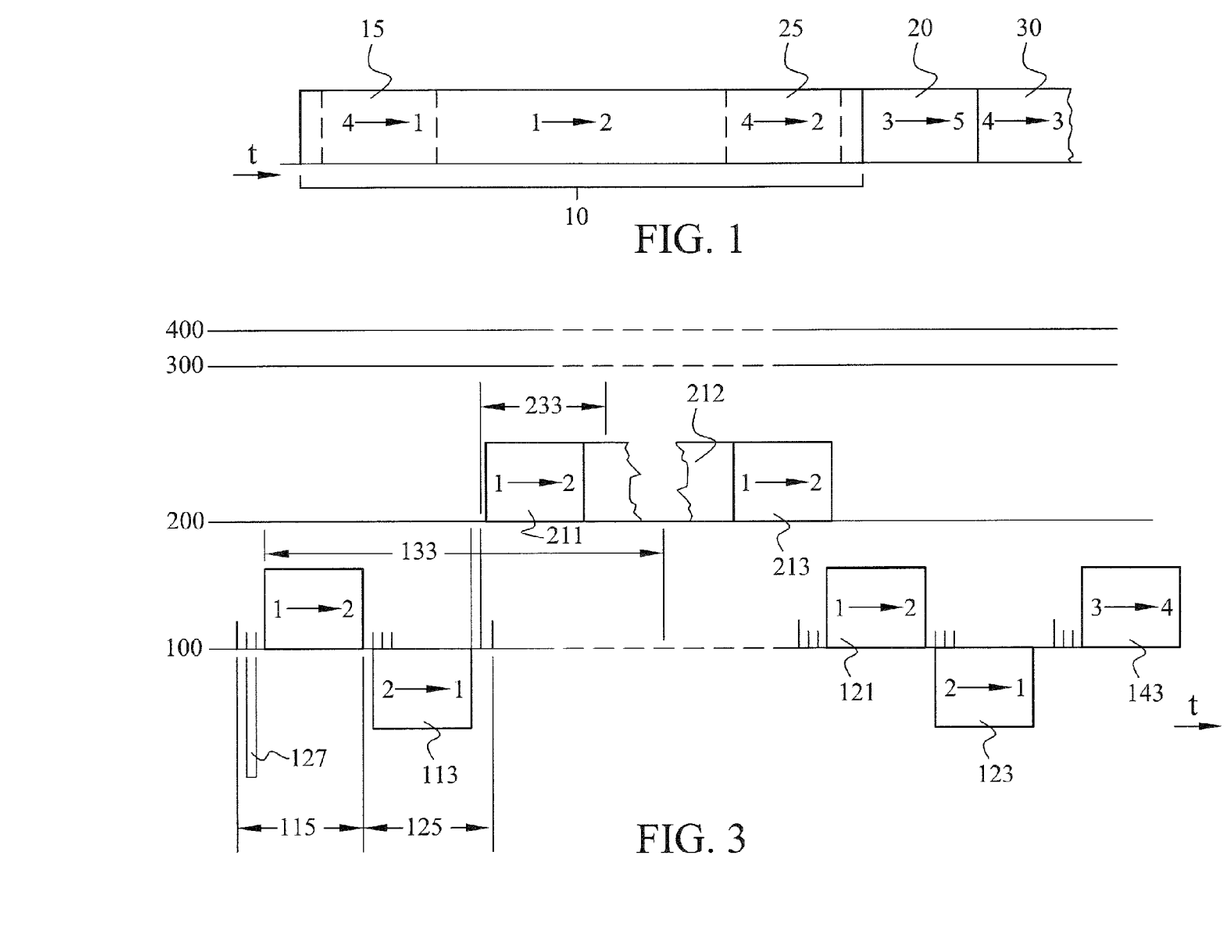
FIG. 1 is a graphical representation of the exchange of data over a single channel in a conventional communications network.
FIG. 3 is a graphical representation of the exchange of data in a communications network according to the present invention including the distributed trunking mechanism and a CSMA control channel access protocol.

A typical communication system with five nodes communicating over a single channel according to this protocol is disclosed in FIG. 1. The timeline (t) of channel transmissions shows that during time period 10 a message is transmitted from node 1 to node 2. During the time period 20 a message is transmitted from node 3 to node 5. During the time period 30 a message is transmitted from node 4 to node 5. No protocol is in place to prevent collisions. The nodes transmit whenever there is a message to be sent. As a result, collisions between transmissions will occur. For example, node 4 is shown as attempting to transmit a message to node 1 during time period 15 which will collide with the transmission from node 1 to node 2 during time period 10. Similarly, the transmission from node 4 to node 2 during time period 25 will collide with the transmission from node 1 to node 2 during time period 10. These collisions may prevent either message from being received, resulting in the inefficient requirement for retransmissions.

An existing network access protocol attempts to avoid collision. The Carrier Sense Multiple Access (CSMA) protocol, requires that a source node having a message to broadcast over the common channel first "listen" for activity on the channel. If activity is detected (i.e. another node is transmitting), then the source node waits for a time period before re-attempting transmission. The CSMA protocol reduces the need for retransmissions, since collisions are rare. However, retransmissions may still be required if the receiving node is not available because, for example, it is out of range or powered off.

Another network access protocol is Time Division Multiple Access (TDMA). The TDMA protocol eliminates collisions by dividing the common channel into time frames and slots. Each node is assigned a particular time slot in which to transmit all of its messages. Collisions are eliminated because nodes only transmit during their assigned slots. However, the TDMA protocol may result in excessive delays and under utilization of the common channel, since each node must wait for its designated time frame and time slot to transmit.

Other wireless communication systems use multiple channels. For example, in a cellular digital packet data system multiple channels are provided permitting more than one pair of nodes to exchange data simultaneously. In addition to the communicating nodes, the system also includes base stations that control communications between the nodes. Each base station covers a particular geographic service area and controls communications to and from nodes located in that area. In order to deliver a message the communication system must first locate the destination node. To locate a destination node, the network broadcasts a location message from each of the base stations in the service area until the destination node responds. This procedure dedicates a large amount of network resources to locating nodes. In addition, failure or elimination of the base station generally causes a loss of all communications.

Conventional multi-channel wireless communication systems typically include a control channel and at least one data channel. The data channel is used for voice and data transmissions between pairs of nodes. The control channel is used for the transmission of control data between a base station and a node. Such control data may include, for example, instructions for the node to change to a particular data channel in order to receive an incoming transmission from another node. In conventional systems, nodes do not communicate with each other over the control channel.

As discussed above, the current methods of providing channel access in wireless networks have many shortcomings. It is an object of the present invention to obviate many of these shortcomings and to provide a novel wireless communication system and method for providing efficient channel access.

Accordingly, it is an object of the present invention to provide a novel system and method for communicating between nodes of a single channel wireless network using a channel access protocol that avoids the need for a large number of message retransmissions.

It is another object of the present invention to provide a novel system and method for communicating between nodes of multiple channel wireless network using a channel access protocol that avoids the need for a large number of message retransmissions.

It is yet another object of the present invention to provide a novel system and method for communicating between nodes of a single channel wireless network using a channel access protocol that reduces collisions between messages.

It is still another object of the present invention to provide a novel system and method for communicating between nodes of multiple channel wireless network using a channel access protocol that reduces collisions between messages.

It is a further object of the present invention to provide a novel system and method for communicating between nodes of a single channel wireless network using a hybrid CSMA/TDMA channel access protocol.

It is yet a further object of the present invention to provide a novel system and method for communicating between nodes of multiple channel wireless network using a hybrid CSMA/TDMA channel access protocol.

It is still a further object of the present invention to provide a novel system and method for VHF communications that provides for communications between multiple nodes without the use of a base station.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

An embodiment of ranking connection requests according to the disclosed subject matter is shown in FIG. 8. The method of ranking connection requests in a communication network that includes a plurality of nodes communicating over a radio channel, provides a plurality of connection requests to one of the plurality of nodes where each of the requests identifies a destination node to be connected with as shown in Block 801. The method assigns a set of parameters to each of the connection request as shown in Block 803. The parameters assigned to each connection request further include:
  (i) a parameter identifying the urgency of the connection request; Block 803(i),
  (ii) a parameter identifying the loss priority of transmitting the connection request, Block 803(ii); and,
  (iii) a parameter identifying the importance of the connection request relative to other connection requests, as shown in Block 803(iii).

The method also monitors the age of each connection request as shown in Block 805; ranks each one of the plurality of the connection requests based on the values of the assigned parameter and the age of the each one of the plurality of the connection requests as shown in Block 807. The method then transmits the highest ranked connection requests as shown in Block 807.

DESCRIPTION OF PREFERRED EMBODIMENTS

The present invention is directed to a wireless communication network with a fixed number of radio channels (i.e. 1, 2, 3, 4, . . . ). One of the channels is designated as a control channel accessible by all network nodes. The remaining channels are designated as data channels and are used for voice and data transactions between pairs of nodes. In the case of communication system with a single channel, the channel may serve as both a control and data channel.

The communications network may include an arbitrary number of mobile and fixed nodes, scattered in random fashion over the geographical region of interest. The degree of connectivity between nodes may not be known at all times and is determined by the each node's antenna coverage area. The connectivity status may change during the course of network activity due to atmospheric changes, node movement, failure/recovery or other dynamic factors. Additionally, obstruction by the earth, channel match between the transmitter and the receiver, propagation delay, received signal strength, signal-to-noise ratio, bit error rate for given modulation type, error correction and message collisions may be important factors in determining the success or failure of a given transmission.

Each node includes a transmitter and a receiver or a transceiver. A transceiver at a particular node may be tuned to either the control channel, which is shared by all nodes, or to a data channel dynamically allocated for data exchange between pairs of nodes. During monitoring of the channels, the node may be in one of the following three states: receiving, transmitting or idle. The channels are preferably half-duplex, so that none of the nodes can simultaneously receive and transmit.

Idle nodes monitoring the control channel receive all detected transmissions on the channel regardless of whether the idle node is the destination node for the transmitted message. A node will initiate its own transmission on the control channel when it has a message destined for another node in its internal message queue, and requires a data channel to deliver the message.

Access to data channels may be negotiated between nodes on the multiple access control channel. Through the negotiation process a pair of nodes (i.e. a source node and a destination node) select a data channel for communications. Once a particular data channel has been selected for communication it becomes unavailable to the other nodes in the network, thus eliminating the potential for collisions. Information about the channel negotiation was received by all of the nodes tuned to the control channel at the time of the negotiation. A node might not have the correct status of the availability of a particular data channel if during the channel negotiation it was not monitoring the control channel because it was, for example, powered down, out of range or involved in another transaction. Transmission over the data channel may initiate as soon as the source node obtains access to it and determines that the channel is not occupied by any other connection.

Once a source and destination node have completed the exchange of data, the nodes switch back to the control channel to inform the rest of the network that the data channel has been released and is now available. The nodes continue to listen to the control channel until one is needed to start new exchange. Each node monitors the control channel to determine the status of the data channels. During the monitoring of the control channel each node may continuously update an internal database of current network conditions. The information stored in the database may assist the node in future channel selections and facilitate some other protocol procedures.

In order to reduce the probability of nodes selecting a channel that is already in use, data channels may be divided into two groups at every node. The first group consists of data channels whose status is positively known to the node. The first group includes the data channels that have been made available during the node's uninterrupted monitoring of the control channel following the node's return from a data channel. The second group consists of the data channels that appear to be available to the node, but their definite status is unknown. The data channels in the second group were available to the node prior to the last time the node switched to a data channel.

During channel negotiations, a source node may randomly choose from the second group only after all the data channels in the first group have been rejected by the destination node. The destination node accepts the data channel proposed by the source node if the data channel belongs to either of the two groups stored in its database. The destination node rejects the proposed channel if it knows that the channel is occupied. Whenever a node needs to select a new data channel but determines that all of the available data channels are busy, it waits until any data channel is released or until the maximum channel occupancy time, preferably 0.5 sec, expires and then assumes that the oldest busy channel is now available.

In the event a data channel conflicts occurs, despite the use of the procedure set forth above, the present invention includes a process focused on minimizing the number of retransmissions and renegotiations. If either one of the nodes that switched over to the data channel determines that the data channel is occupied by another connection, it drops the selected data channel immediately and switches to the control channel for the next round of channel negotiations.

Figure 2:
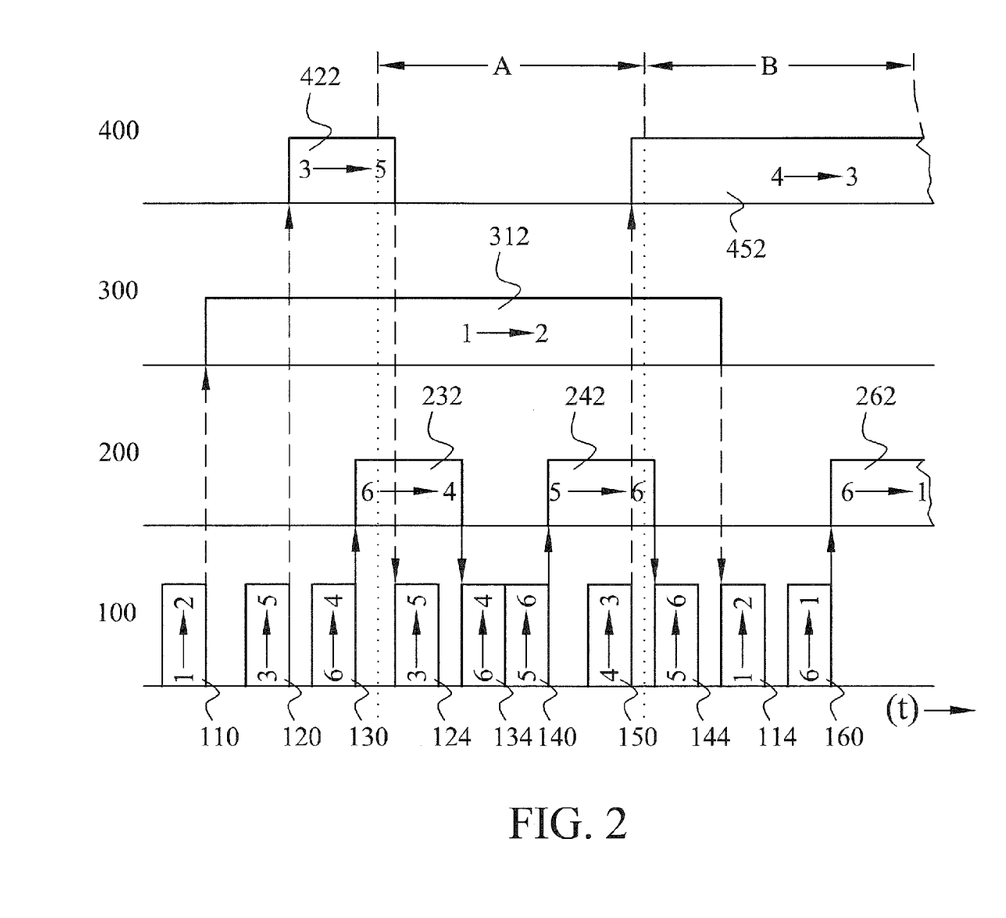
FIG. 2 is a graphical representation of the exchange of data in a communications network according to the present invention including the distributed trunking mechanism.

An example of the data exchange procedure of the present invention is shown in FIG. 2. The disclosed system includes three data channels 200, 300, 400 and a control channel 100. Transmissions in each channel over time (t) are displayed graphically in FIG. 2. A source node broadcasts its channel request to the network over the control channel 100. A destination node responds by either agreeing or rejecting to communicate on the requested channel. Acceptance of the channel depends on information the node currently has about the status of the requested channel. If requested data channel is not acceptable for the destination node, then it suggests a different channel and asks the source node to agree to it. The process repeats until the nodes agree on the channel. The data channel is agreed upon when both the source and the destination nodes consider it available, and after they have informed each other and the rest of the nodes accessible to them about their intent to occupy the channel. When the communication on the data channel is completed, the nodes switch back to the control channel 100 to inform the rest of network about the channel being released.

By way of example, communications among six nodes are disclosed in FIG. 2. As illustrated in FIG. 2, nodes 1 and 2 negotiate on the control channel 100 during the time period 110 and agree to communicate on data channel 300 over which communication takes place during time period 312. Once their communications are complete, nodes 1 and 2 return to the control channel 100 and exchange messages during time period 114 thereby informing the network that the data channel 300 is available.

Similarly, Nodes 3 and 5 negotiate on the control channel 100 during time period 120 and agree to communicate on data channel 400 over which communication takes place during time period 422. Once the exchange of data is complete, the nodes return to the control channel 100 and exchange messages during time period 124 that inform the rest of the network that the data channel 400 is available.

In addition, nodes 4 and 6 negotiate on the control channel 100 during time period 130 and agree to communicate on data channel 200 over which communication takes place during time period 232. Once communications are complete, the nodes return to the control channel 100 and exchange messages during time period 134, thereby informing the rest of the network that the data channel 200 is available.

In still another example, once their first communications are complete, nodes 3 and 4 negotiate over the control channel 100 during time period 150 to communicate on data channel 400 and do so during time period 452. Similarly, nodes 1 and 6 negotiate on the control channel 100 during time period 160 to communicate on data channel 200 over which the nodes exchange communications during time period 262.

The communications between the nodes may include either voice or data communications. Preferably communications are conducted using digital data packets. Packets may contain either voice or data. When transmitted over the control channel, packets are referred to as control packets. Because of the existence of multiple data channels, certain data channels may be designated for use as voice or data only in order to expedite communications. As may be seen from FIG. 2, the present invention allows for simultaneous voice and data exchange (during time periods A and B) and improved efficiency. Preferably, both the data channel negotiations and data channel release communications over the control channel may be accomplished by mutually exchanging data packets of a special format, so that all of the nodes in the source and the destination coverage areas get appropriate notification.

While the examples described relate to communications between pairs of nodes, it is within the scope of the present invention that the techniques and innovations be applied to permit simultaneous communications among several nodes at once. For example, negotiations might take place between three nodes over the control channel to select a single data channel for communications between the three nodes.

A channel access protocol may be employed in order to ensure that all of the nodes have fair access to the control channel for data channel negotiations. In an embodiment of the present invention CSMA is used as a control channel access protocol. The protocol ensures that the nodes do not start to transmit a packet over the control channel until they determine that the control channel is not occupied. If two nodes wish to transmit a request, response, or channel release notification packet over the control channel almost simultaneously, and they do not have enough time to learn about each others intentions, a collision may occur. To minimize the probability of a collision, the CSMA protocol includes two techniques.

The first technique contained in the CSMA protocol is directed to collision avoidance, and exploits the fact that certain network transmissions may be predicted. For example, a channel request packet from the source node is generally followed by a response packet from the destination node. Similarly, a channel release request packet transmitted by the source node is generally followed by a channel release response packet transmitted by the destination node. Therefore, the protocol requires that when a node waiting to transmit receives a data packet that requires a response and the data packet is not addressed to the node, the waiting node may not start a transmission until the actual destination node has had time to respond. The protocol prevents undesirable collisions and gives priority to data channel negotiations that have already started.

The second technique contained in the CSMA protocol uses major time slots to approximately synchronize and distribute starting times of data packet transmissions from different nodes. Each major time slot includes a number of mini-slots located at the beginning of the major slot, where the number of mini-slots is equal to the number of nodes in the network. The duration of a major time slot is equal to the packet transmission time plus the duration of the mini-slots. Preferably, all packets transmitted in the control channel are of equal duration. The duration of a single mini-slot is equal to the maximum propagation delay for a given network topology (such as the coverage area of the network). A given node waiting to transmit starts its major slot when, it will not interfere with any transmission as determined by the collision avoidance mechanism described above. The majority of the nodes will start their major slots almost simultaneously and the start of actual transmission is scheduled to coincide with the beginning of a randomly chosen mini-slot within the major slot. Consequently, only the packets whose transmission begins at the first chosen mini-slot will experience the collision. The rest of the contending nodes will not start their transmission due to the carrier sense capability and properly chosen mini-slot duration. Since it is always desirable to favor negotiation that has already been in progress, the first mini-slot of every major slot is dedicated to response packets.

In order to ensure that messages are transmitted according to priority. The mini-slots may be assigned to nodes based on the priority of the packet to be transmitted. A discussed in more detail below, message priority may be determined based on the urgency, age and relative importance of the messages.

In order to improve network efficiency, the network includes a designated time-out period. If a source node waiting for a response from a destination node does not receive it before the time-out, it retransmits its request and waits for the response until the second time-out expires. In the latter case, the destination node is considered busy or temporarily out of reach, and the source node attempts to either establish another connection or waits until it hears from this destination. If, instead of the response from the destination node, a request packet is received (from another node), and this request has higher or equal priority, the source node assumes that its request has been lost, and services the received request by sending a response packet and postponing its attempt to establish a new connection. If the received request has lower priority, the source node updates its information and ignores the request. Waiting may also be aborted whenever any information is received that might indicate a non-reception of the request packet by the destination node. An example of such information is the presence on the control channel of any response packet (except the response from the destination node to the source node) which is either originated at or destined for the destination node, or a request packet generated by the destination node.

With reference to FIG. 3, the CSMA control channel access protocol will now be described in operation. The control channel 100 is divided into major time slots 115, 125. Each time slot includes mini-slots 127. The data exchange begins with node 1 transmitting a control request packet 111 to node 2 requesting to use the data channel 200 for the transmission of data. Node 2 transmits a control response packet 113 responding in the affirmative. The response packet 113 is transmitted at the beginning of the first mini-slot within the major slot 125 following the control request packet 111. After allowing for switch time 117, node 1 transmits a data request packet 211 over the data channel 200. The data request packet 211 is followed by data frames 212. Data transmission is complete when node 1 sends a data release request packet 213 over the data channel 200 requesting that node 2 switch to the control channel 100. Next, node 1 sends a control release request packet 121 to node 2 after a delay allowing node 2 to switch to the control channel 100. Node 2 response with a control release response packet 123 that is transmitted in the first mini-slot of the following major slot. The rest of the nodes postpone their transmission for the duration of one major slot to allow for node 2 to complete its transmission. The next channel access begins with node 3 transmitting a control request packet 143 to node 4. As discussed above, the protocol provides for a time out on both the control 133 and data channels 233.

Figure 4:
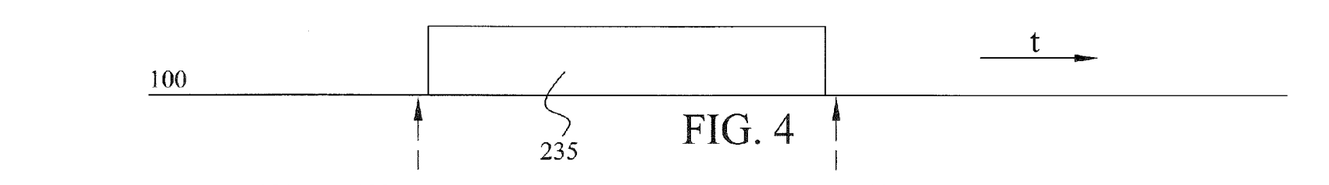
FIG. 4 is a graphical representation of the data exchange over a single channel according to the present invention.
Figure 5:
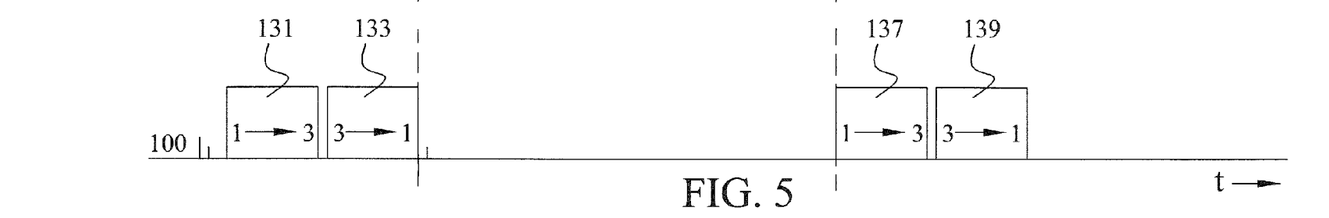
FIG. 5 is a graphical representation of the data exchange over a communications network according to the present invention including a CSMA channel access protocol.

FIG. 5 discloses an example of the CSMA control channel access protocol of the present invention in use in a network with three nodes. The protocol may be implemented in either a single or multi-channel system. In a single channel system, the voice and data exchange occur over the control channel. Nodes 1 and 3 exchange control packets 131, 135 which function as a notification of control channel availability rather than a negotiation to use a particular data channel. Once the nodes agree to exchange data, then data packets 235 are exchanged over the control channel or a separate data channel as shown in FIG. 4.

Figure 6:
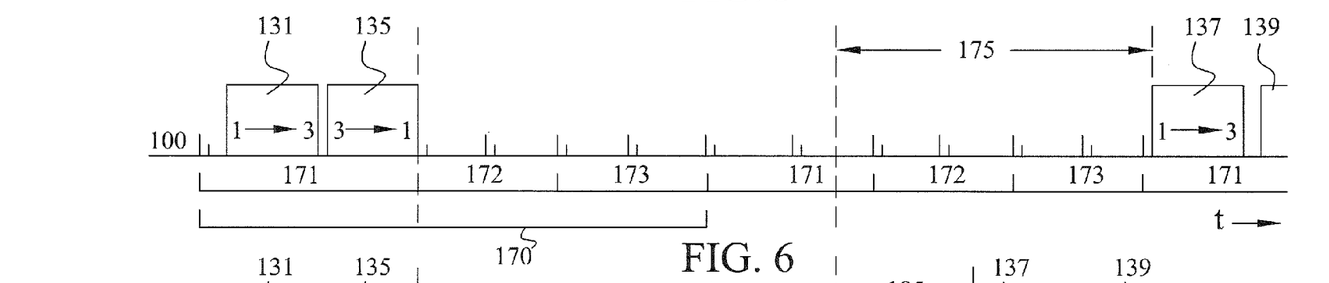
FIG. 6 is a graphical representation of the data exchange over a communications network according to the present invention including a TDMA channel access protocol.

The present invention includes using Time Division Multiple Access (TDMA) as an alternative to CSMA as a control channel access protocol. As shown in FIG. 6, the control channel may be divided into a time series of frames called epochs 170. Each epoch is in turn subdivided into time slots (171, 172 and 173) with a duration twice larger than needed to transmit a control packet. Time slots are numbered in round-robin fashion, and only one node is allowed to transmit in the first portion of the time slot that is assigned to it. The duration of an epoch is determined by the size of the network or subnet (i.e. the number of nodes). The second portion of every time slot in the epoch 170 is dedicated to the transmission of response packets, which are sent immediately after the request reception.

There is a delay introduced when the data channel (or control channel in the case of a single channel system) is released. The delay occurs because data exchange completion is unrelated to the control channel epoch structure, and two nodes releasing the data channel are forced to wait for their next time slot in order to transmit the channel release notifications.

FIG. 6 illustrates the TDMA control channel access protocol. As described above, the control channel 100 is divided into epochs 170 and time slots 171, 172 and 173. The data exchange begins with node 1 transmitting a control request packet 131 to node 3. Node 3 transmits a control response packet 133 responding in the affirmative. The response packet is transmitted at the beginning of the second half of the time slot 171 assigned to node 1. After allowing for switch time nodes 1 and 3 exchange data 235 over the data channel (or the control channel) as shown in FIG. 4. Next, node 1 sends a control release request packet 137 to node 3 after a delaying a time period 175 to wait for its assigned time slot 171. Node 3 responds with a control release response packet 139 that is transmitted in the second half of the time slot 171.

The TDMA collision-free access protocol of the present invention may be preferred for use with packet radio nets. Packet radio nets typically operate in an environment known to be complicated by hidden terminals, constantly changing topology, severe channel fading and interference.

Both the CSMA and TDMA channel access protocols of the present invention include time-out periods. The time out periods for the CSMA protocol are shown in FIG. 3. The destination node is required to automatically switch to the control channel when it does not detect any foreign communication on the data channel, and does not receive a data request packet from the source node before the data channel time-out 233. The time-out may be reached when the data channel is used by another pair of nodes in the source coverage area, but the destination node's antenna cannot detect the communications. In addition, the data channel time-out may be reached when the source node fails to switch to the data channel, because the response packet from the destination node indicating acceptance of the channel has been lost. The duration of the data channel time-out 233 is set at a value sufficient to allow time for the source node to switch to the data channel, to send its data request packet, and for the destination node to receive it. The criteria for data channel time out places a lower bound on the control channel time-out 133 duration (time after which previous packet transmission is considered unsuccessful, and its retransmission is allowed). The destination node must return to monitoring the control channel by the time the source node retransmits its request. Therefore, the control channel time-out is at least as long as the data channel time-out plus twice the switching time and twice the request transmission time. The inclusion of request packet transmission time is required because the protocol allows only one transmission attempt after collision (in the CSMA protocol). This transmission begins in the second major time slot following the collision, which gives other nodes an opportunity to finish their exchange (collision may not be detected at all nodes). In the TDMA protocol, the lower bound on the control channel time-out is also determined by the epoch duration.

If the destination node successfully receives the data request packet from the source node (and therefore cancels its data channel time-out), but, for any reason, fails to receive the data release request packet, indicating the end of data transmission over the data channel, it is forced internally to switch to the control channel after the maximum data channel occupancy time, preferably approximately 0.5 sec, expires.

Figure 7:
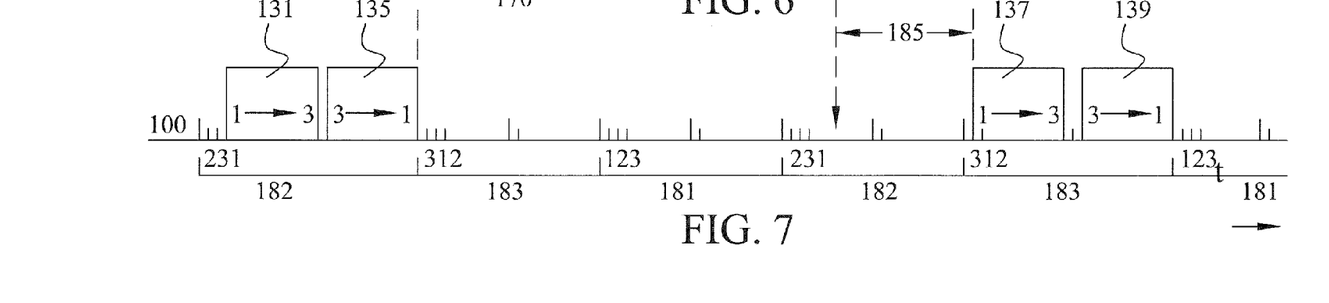
FIG. 7 is a graphical representation of the data exchange over a communications network according to the present invention including a hybrid TDMA/CSMA channel access protocol.

Another embodiment of the present invention combines the features of the CSMA and TDMA channel access protocols discussed above, resulting in a hybrid CSMA/TDMA protocol. The epoch structure is similar to the structure employed in the TDMA protocol. The hybrid protocol differs from the TDMA based protocol because, every time slot begins with a series of mini-slots each of which has a duration equal to the maximum propagation delay in the subnet. The number of mini-slots is equal to the number of nodes and each node is allowed to start transmission only in the beginning of the mini-slot which is uniquely assigned to it. Mini-slots are numbered sequentially in the round-robin fashion and the initial mini-slot number itself changes cyclically from one time slot to another as shown in FIG. 7. This structure ensures fair access for all nodes in the subnet. As time (t) progress, a node, which was initially privileged by having its mini-slot start before the mini-slots of all other nodes, loses its access priority in favor of those nodes that were disadvantaged by the late mini-slots. Similar to the CSMA based protocol, control packet transmission is allowed only if the control channel is idle. The hybrid CSMA/TDMA protocol eliminates collisions almost completely, and does not include the delays associated with a TDMA based protocol.

With reference to FIG. 7, the hybrid CSMA/TDMA control channel access protocol will now be described in operation. As described above, the control channel 100 is divided into time slots (181, 182 and 183). At the beginning of a given time slot 181 are mini-slots. By way of example, for a three node system there are three mini-slots at the beginning of each time slot (e.g. 181-1, 181-2 and 181-3), as shown in FIG. 7. The data exchange begins with node 1 transmitting a control request packet 131 to node 3. The control request packet 131 is transmitted at the beginning of the mini slot 181-1 assigned to node 1. Node 3 transmits a control response packet 135 responding in the affirmative. The response packet is transmitted immediately following the transmission of the request packet in the time slot 182 assigned to node 1. After allowing for switch time, nodes 1 and 3 exchange data 235 over the data channel (or the control channel) as shown in FIG. 4. Next, node 1 sends a control release request packet 137 to node 3 after a delaying a time period 185 to wait for its assigned mini-slot in the next available time slot 183. Node 3 responds with a control release response packet 139 that is transmitted in the second half of the time slot 182.

In some situations, nodes may receive a request for connection from a third node while engaging in data channel release packet exchange with another node. In such circumstances, the new request is placed in a data packet queue at the node and, after the channel release is completed, is serviced provided that the priority of the request packet exceeds the priority of the node's own highest priority data packet. Otherwise, the received request is ignored and channel negotiation for transmission of the higher priority packet is initiated by generating and sending a new request packet.

In addition to the channel negotiations described above, the control channel may be used for direct data transmission of small data packets. This may be done when new data channel allocation is not feasible, or when load on the control channel allows it to accept more traffic without significant degradation in performance. If necessary, the same channel access protocol may be used for data exchange on the control channel as for the exchange of control information.

The present invention provides fair access to network resources for all nodes. As discussed above, transmission start times on the control channel are determined using either a randomization process in the CSMA protocol or a rotating priority in the TDMA and hybrid CSMA/TDMA protocols. In addition, the present invention also includes a method for determining the priority of each connection request or message received by the nodes.

Each connection request or message that is delivered to the node from a higher protocol layer includes a set of parameters that describes its service class. These parameters may include maximum time in queue (Tqmax) and maximum connection lifetime (Tcmax) and priority class. Tqmax describes a delay priority or an urgency of the connection and Tcmax describes a loss priority or importance of the connection. The priority class identifies the importance of the connection with respect to other services supported by the network and, therefore, the ability of the connection request to override or preempt other connections contending for network resources. Different combinations of these three parameters describe a full spectrum of possible service classes.

After a connection request is delivered by the higher layer protocol, it is processed in a priority manager located at each node, according to its priority class. The priority manager monitors the time spent by the connection request in the node's message queue (i.e. the age of the message (Tq)). The priority manager also determines which message should be serviced based on the value of a window parameter (W) that is determined according to the formula: W=Tqmax−Tq. The channel access protocol attempts to service the connection request of the highest priority (as determined by priority class) with the largest age (as determined by the window parameter) first. When the most urgent connection request cannot be serviced immediately, the channel access protocol permits the next most urgent connection request to be serviced if the message duration is short enough to fit within the window of the most urgent connection. However if the connection request does not fit, or if the value of the window parameter for the most urgent connection request is less than or equal to zero (i.e. the service deadline for the connection request has been reached), the channel access protocol must keep trying to service the connection request with the highest priority classification. Connection requests whose age exceed their maximum lifetime (Tcmax) are removed from the queue.

Figure 8:
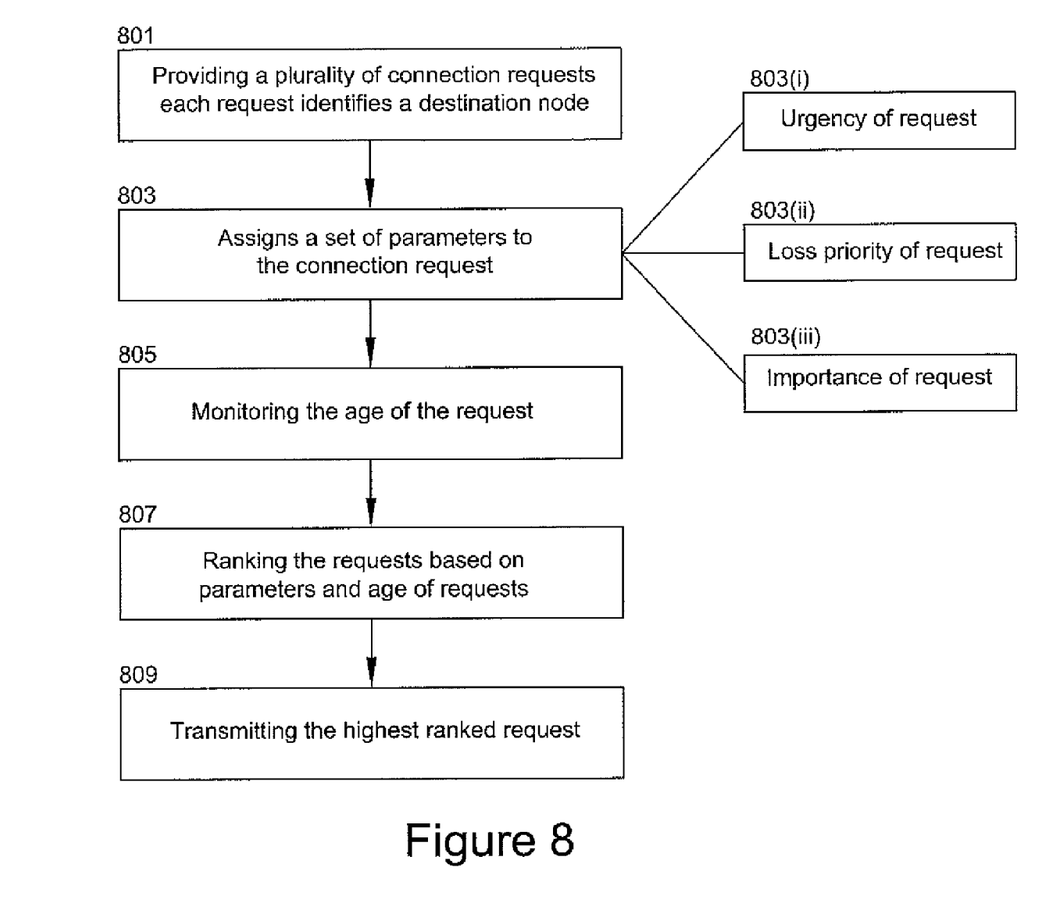

An embodiment of ranking connection requests according to the disclosed subject matter is shown in FIG. 8. The method of ranking connection requests in a communication network that includes a plurality of nodes communicating over a radio channel, provides a plurality of connection requests to one of the plurality of nodes where each of the requests identifies a destination node to be connected with as shown in Block 801. The method assigns a set of parameters to each of the connection request as shown in Block 803. The parameters assigned to each connection request further include:

(i) a parameter identifying the urgency of the connection request; Block 803(*i*), (ii) a parameter identifying the loss priority of transmitting the connection request, Block 803(*ii*); and, (iii) a parameter identifying the importance of the connection request relative to other connection requests, as shown in Block 803(*iii*).

The method also monitors the age of each connection request as shown in Block 805; ranks each one of the plurality of the connection requests based on the values of the assigned parameter and the age of the each one of the plurality of the connection requests as shown in Block 807. The method then transmits the highest ranked connection requests as shown in Block 807.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of ranking connection requests in a communication network that includes a plurality of nodes communicating over a radio channel, comprising the steps of:
    (a) providing a plurality of connection requests to one of the plurality of nodes, each request identifying a destination node to be connected to;
    (b) assigning a set of parameters to each connection request wherein the set of parameters assigned to each connection request further comprises:
        (i) a parameter identifying the urgency of the connection request;
        (ii) a parameter identifying the loss priority of transmitting the connection request; and,
        (iii) a parameter identifying the importance of the connection request relative to other connection requests;
    (c) monitoring the age of each connection request;
    (d) ranking the each one of the plurality of the connection requests based on the values of each assigned parameter and the age of the each one of the plurality of the connection requests; and
    (e) transmitting the highest ranked connection request, wherein a lower priority connection request may be transmitted before a higher priority connection request if the transmission of the lower priority request does not violate the service deadline of the higher priority packet.

2. A method of ranking connection requests in a communication network that includes a plurality of nodes communicating over a radio channel, comprising the steps of:
    (a) providing a plurality of connection requests to one of the plurality of nodes, each request identifying a destination node to be connected to;
    assigning a set of parameters to each connection request wherein the set of parameters assigned to each connection request further comprises:
        (i) a parameter identifying the urgency of the connection request;
        (ii) a parameter identifying the loss priority of transmitting the connection request; and,
        (iii) a parameter identifying the importance of the connection request relative to other connection requests;
    (c) monitoring the age of each connection request;
    (d) ranking the each one of the plurality of the connection requests based on the values of each assigned parameter and the age of the each one of the plurality of the connection requests; and
    (e) transmitting the highest ranked connection request, further comprising the step of determining a parameter for each connection request based on the value of the assigned parameter identifying the urgency of the connection request and the age of the connection request.

3. The method of claim 2, wherein the step of ranking further comprises ranking the each one of the plurality of connection requests based on the values of each assigned parameter and the value of the determined parameter.

* * * * *